Jan. 29, 1957  E. C. McRAE  2,779,603
VEHICLE STEERING ASSEMBLY WITH BALL JOINT SUSPENSION
Filed Sept. 14, 1953  2 Sheets-Sheet 1

E. C. McRAE
INVENTOR.

BY

ATTORNEYS

Jan. 29, 1957  E. C. McRAE  2,779,603
VEHICLE STEERING ASSEMBLY WITH BALL JOINT SUSPENSION
Filed Sept. 14, 1953  2 Sheets-Sheet 2

E. C. McRAE
INVENTOR.
BY J. R. Faulkner
L. H. Oster
ATTORNEYS

United States Patent Office 2,779,603
Patented Jan. 29, 1957

2,779,603

VEHICLE STEERING ASSEMBLY WITH BALL JOINT SUSPENSION

Edwin C. McRae, Dearborn, Mich., assignor to Ford Motor Company, Dearborn, Mich., a corporation of Delaware Application September 14, 1953, Serial No. 380,063

2 Claims. (Cl. 280—95)

This invention relates generally to wheel suspensions for motor vehicles, and particularly to front wheel suspensions of the ball joint type.

The invention has reference to independent front wheel suspensions of the type in which ball joints are used between the outer ends of upper and lower suspension arms and the upper and lower ends respectively of the spindle support to accommodate both the steering movement of the front wheels and also the jounce and rebound movements of the wheel relative to the frame. Heretofore it has been customary to provide an anti-friction load carrying ball joint between the lower arm and the lower end of the spindle support and a friction producing joint between the upper suspension arm and the upper end of the spindle support. A relatively large amount of friction must be introduced into the upper joint to provide the necessary road wheel stability since the friction is only partially effective when the road wheels are moving vertically relative to the frame due to the condition of dynamic friction existing between the cooperating portions of the ball joint during this vertical movement of the wheel.

In the construction of the present invention an anti-friction joint is used between the lower suspension arm and the lower end of the spindle support but the friction producing ball joint between the upper suspension arm and the upper end of the spindle support is eliminated. In its place is a ball joint assembly comprising a full ball inserted into the socket carried at the end of the suspension arm, the ball having a vertically threaded opening therethrough receiving the threaded upper end of the spindle support. The ball is arranged so as to be held against free rotation and is permitted oscillation only about a horizontal axis extending longitudinally of the vehicle so as to permit the necessary oscillation between the ball and socket during the rising and falling movement of the road wheel relative to the vehicle frame. Turning movement of the spindle support and the road wheel carried thereby is permitted by means of the threaded engagement between the upper end of the spindle support and the ball. This construction provides an economically manufactured and trouble free ball joint and results in a suspension requiring considerably less steering effort on the part of the driver since the upper joint is not of the friction producing type. In this connection it is proposed to introduce friction into the steering linkage to provide the necessary road wheel stabilization. This friction, however, is introduced at a point other than the upper ball joint, and for example may be provided by means of a spring loaded friction washer between the steering idler arm and its mounting bracket. Less friction is required at this point to provide the necessary wheel stability than would be required at the upper ball joint, since the friction at the idler arm is not diminished by reason of relative vertical movement between the road wheel and the frame.

Other objects and advantages of this invention will be made more apparent as this description proceeds, particularly when considered in connection with the accompanying drawings, wherein.

Figure 1:
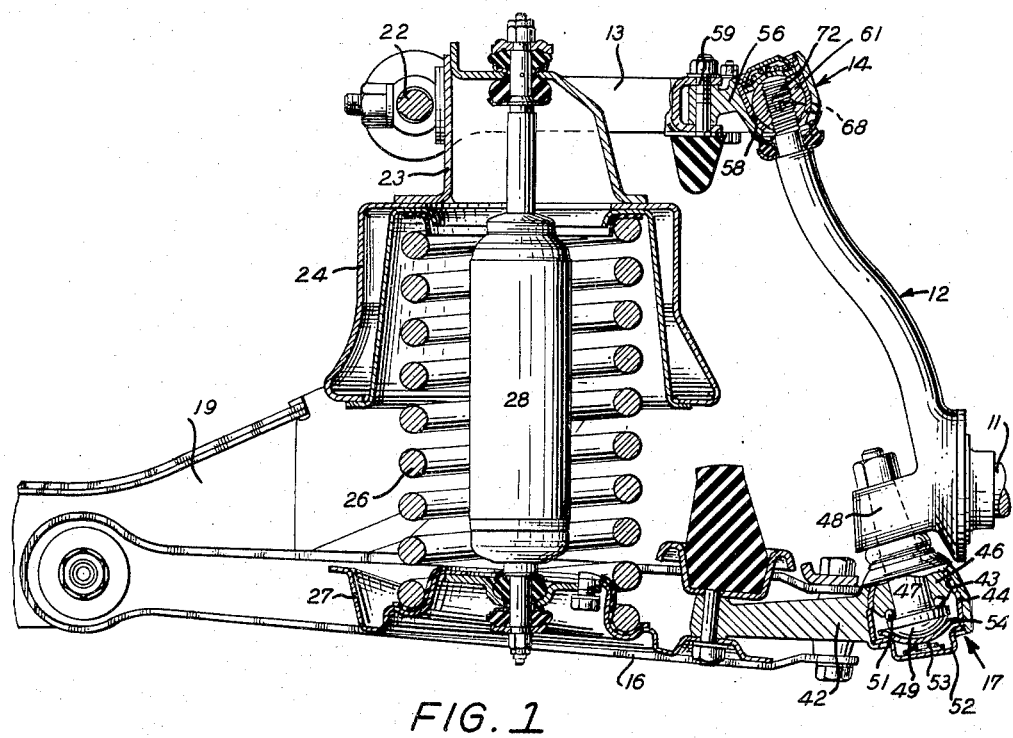
Figure 1 is a transverse vertical cross-sectional view of a portion of a front wheel suspension of a motor vehicle, incorporating the present invention.
Figure 4:
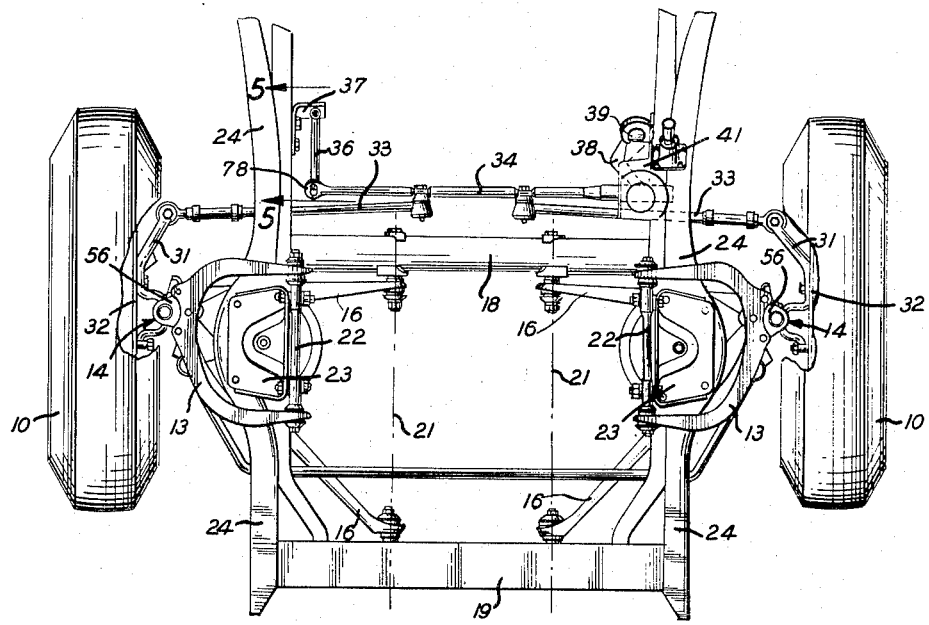
Figure 4 is a plan view of the forward portion of the chassis of the motor vehicle illustrated in Figure 1.

Referring now to Figures 1 and 4, there is illustrated a motor vehicle chassis having independently suspended steerable front road wheels 10. Each road wheel is conventionally rotatably mounted upon a wheel spindle 11 formed integrally with a spindle support 12, which is preferably a forging. The upper end of the spindle support 12 is connected to an upper suspension arm 13 by means of a ball joint assembly 14, while the lower end of the spindle support is connected to the lower suspension arm 16 by means of a ball joint assembly 17, as will be described more in detail hereinafter.

The lower suspension arm 16 is of the wishbone type, and its bifurcated arm portions are pivotally connected to frame cross members 18 and 19 to permit oscillation of the lower arm about a generally horizontal longitudinally extending axis 21. The upper suspension arm 13 is also of the wishbone type and the inner ends of its bifurcated arm portions are pivotally connected to the opposite ends of a horizontal longitudinally extending pivot shaft 22 to permit oscillation of the upper arm about the axis of this shaft. The pivot shaft 22 is bolted to a bracket 23 secured to the upper flange of the box section side frame rail 24. A coil spring 26 is conventionally located between the frame side rail 24 and a spring pan 27 carried by the lower suspension arm 16, and a tubular direct acting shock absorber 28 is located concentrically within the coil spring 26 with its opposite ends secured to the spring pan 27 and to the bracket 23 respectively.

With reference particularly to Figure 4, it will be seen that the steering linkage includes spindle arms 31 bolted to the brake backing plates 32 and pivotally connected at their rearward ends to the outer ends of tie rods 33. The inner ends of the tie rods 33 are pivotally connected to transversely spaced points of an intermediate steering link 34 extending transversely of the vehicle frame. One end of the intermediate link 34 is pivotally connected to an idler arm 36, the latter having its opposite end pivotally connected to an idler arm bracket 37 mounted upon the side frame rail 24 of the vehicle. The opposite end of the intermediate link 34 is pivotally connected to the pitman arm 38 nonrotatably mounted upon the lower end of the steering shaft 39 of the steering gear 41.

As seen in Figure 1, the lower ball joint 17 between the lower suspension arm 16 and the spindle support 12 is of the anti-friction type. It comprises a housing 42 projecting from the outer end of the lower suspension arm 16 and secured thereto. The housing 42 is formed with a socket 43 containing a hardened sheet metal shell 44 which in turn receives the semispherical bearing 46. A stud 47 having a tapered shank is mounted in the apertured flange 48 formed integrally with the lower portion of the forged spindle support 12. The stud 47 has an enlarged head 49 engaging a series of loose balls 51 received within a race formed in the semispherical bearing 46. The socket 43 in the housing 42 of the lower ball joint is closed by a cap 52 which also serves as a retainer for a take-up spring 53 and a dished washer 54 provided to take up wear in the joint.

It will be apparent that the weight of the vehicle as well as other vertical loads imposed upon the lower suspension arm 16 are carried through the anti-friction lower ball joint 17. Turning movement of the spindle support 12 to steer the front road wheel is thus accomplished with a minimum of steering effort.

Figures 2, 3:
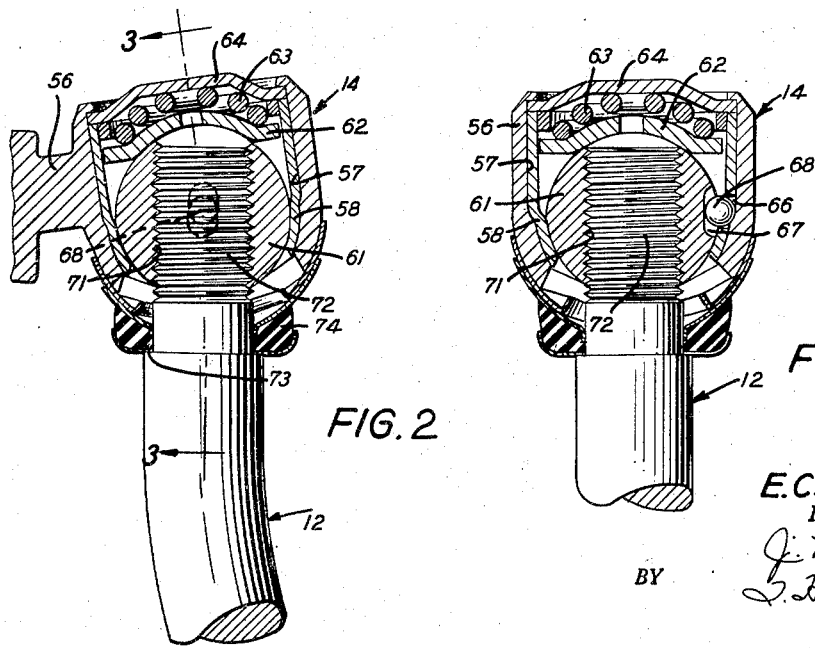
Figure 2 is an enlarged cross-sectional view of a portion of Figure 1, illustrating the upper ball joint.
Figure 3 is a vertical cross-sectional view taken on the plane indicated by the line 3—3 of Figure 2.

The upper ball joint 14 is best seen in Figures 2 and 3 and comprises a housing 56 having a socket 57 formed therein, the latter receiving a hardened sheet metal shell 58. The housing 56 is secured by bolts 59 to the outer end of the upper sheet metal suspension arm 13. Received within the hardened sheet metal shell 58 is a full spherical ball 61. A dished washer 62 engages the upper end of the ball and a take-up spring 63 cooperates with the end cap 64 to exert a slight force upon the ball to compensate for wear. The spring 63, however, is too light to apply any appreciable frictional damping to the ball.

The sheet metal shell 58 is provided with a circular opening 66 in one side thereof, in alignment with an elongated groove 67 of semicircular cross section formed in the adjacent side of the ball 61. A small locating ball 68 is positioned in the aligned openings 66 and 67 during the assembly of the ball joint unit, and serves to prevent free rotation of the ball 61 within its socket. It will be noted, however, that the locating ball 68 is substantially in alignment with the center of the ball 61 in a direction extending longitudinally and horizontally of the vehicle. Consequently, the small ball 68 permits oscillation of the larger ball 61 about a longitudinal axis through the center of the latter. This oscillation of the ball 61 within its socket accommodates the rising and falling movement of the road wheel relative to the frame and the resulting varying angularity between the spindle support 12 and the upper suspension arm 13. It does not, however, permit rotation of the ball 61 in a direction to steer the front road wheels.

The elongated groove 67 permits a limited oscillation of the locating ball 68 along the length of the groove to permit a corresponding oscillation of the ball 61 relative to the housing 56 so as to accommodate angular variations in that direction which occur during the rising and falling movement of the vehicle wheel due to the geometry of the suspension.

The full ball 61 of the upper ball joint assembly 14 is formed with a large threaded bore 71 extending therethrough. This threaded bore receives the correspondingly threaded upper end 72 of the spindle support 12, and it will be apparent that the threaded connection therebetween permits rotation of the spindle support 12 and the front road wheel carried thereby so as to steer the vehicle. The upper end of the spindle support 12 is formed with a shoulder 73 forming a seat for a seal 74 closing the open lower end of the socket 57 formed in the housing 56 of the upper ball joint.

The engagement between the locating ball 68 and the groove 67 in the ball 61 prevents rotation of the ball 61 about the axis of the upper end of the spindle support 12. The ball 61 is thus anchored so that it cannot become inadvertently disengaged from the threaded upper end of the spindle support during continued operation of the vehicle.

Since the lower ball joint 17 is of the anti-friction type, and since there is little load between the threaded upper end of the spindle support 12 and the cooperating threaded bore 71 in the ball 61 of the upper ball joint, the steering effort required to turn the front road wheels is relatively small. In other words, both the upper and lower ball joints of the present construction are free turning.

Figure 5:
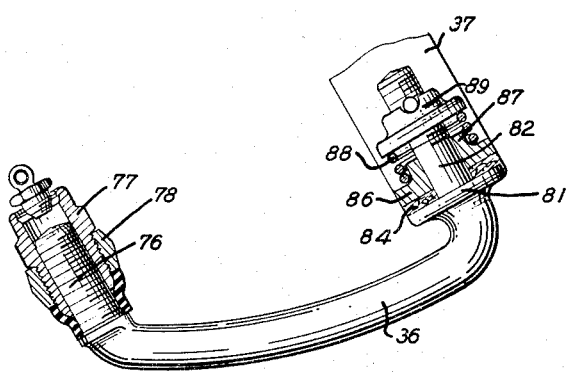
Figure 5 is an enlarged cross-sectional view through the idler arm and bracket, taken on the plane indicated by the line 5—5 of Figure 4.

It is advisable to introduce into the steering system a certain amount of frictional resistance or dampening effect to maintain requisite road wheel stability. With reference now to Figures 4 and 5, it will be noted there is illustrated a construction providing frictional dampening between the idler arm 36 and the idler arm bracket 37 secured to the vehicle frame. If desired, the frictional resistance could be introduced between other relatively movable portions of the steering linkage, in a manner similar to that shown herein.

As seen in Figure 5, the idler arm 36 has at its forward end a threaded portion 76 cooperating with a threaded bushing 77 mounted in the eye 78 at the end of the intermediate cross steering link 34 to provide relative rotation therebetween. At its opposite end, the idler arm 36 is formed with an enlarged integral shoulder 81 and an integral stem 82 threaded at its outer end. The shoulder 81 presents a flat bearing surface for engagement with a friction disk 84 of a suitable friction lining material.

The opposite side of the friction disk 84 engages the adjacent face of the end flange 86 of the idler arm bracket 37 mounted upon the vehicle frame. The end flange 86 is provided with a recessed hub 87 forming a seat for a compression coil spring 88 held in place by a threaded collar 89 adjustably assembled to the threaded end of the stem 82 of the idler arm. By adjusting the collar 89 the force upon the friction disk 84 can be varied so as to adjust the frictional dampening effect between the idler arm 36 and the idler arm bracket 37. The relative rotation between these parts during steering movements affords a predetermined frictional dampening effect which will provide the required road wheel stability.

The friction introduced at this point can be considerably smaller than the friction which would be required in the upper ball joint since the frictional resistance between the idler arm bracket and the idler arm is constant for a given steering movement and is independent of the vertical movement between the road wheels and the frame which, in the friction producing type of the upper ball joint, materially diminishes the friction available at that point for dampening purposes.

The upper ball joint assembly 14 is pre-assembled by first placing the ball 61 within the sheet metal shell 58, then aligning the openings 66 and 67 in the shell and the ball respectively to permit insertion of the locating ball 68 therein, and thereafter inserting the subassembly of the ball 61, shell 58 and locating ball 68 within the socket 57 formed in the ball joint housing 56. The dished washer 62, take-up spring 63 and end cap 64 are then inserted into the socket and the upper edge of the housing 56 is spun over to retain these parts in the assembly. The unit is then attached to the upper end of the spindle support 12 by threading the upper threaded end 72 of the latter into the threaded opening 71 of the ball 61.

If desired, the frictional resistance necessary to provide proper road stability and steering characteristics may be introduced into the pivotal connection between the idler arm 36 and the intermediate cross link 34, into the pivotal connection between the pitman arm 38 and the intermediate cross link 34, or between one of the tie rods 33 and the adjacent spindle arm 31.

It will be understood that the invention is not to be limited to the exact construction shown and described, but that various changes and modifications may be made without departing from the spirit and scope of the invention, as defined in the appended claims.

What is claimed is:

1. In a motor vehicle steering assembly including upper and lower wheel carrying suspension arms, a spindle support, steering gear mechanism and interconnected steering linkage, the combination of a semispherical socket at the outer end of the upper suspension arm, a bearing member having a spherical outer surface seated in said socket, said bearing member having a threaded bore extending generally vertically therethrough, means preventing rotation of said bearing member relative to said socket about a vertical axis but permitting oscillation of said bearing member in said socket about a horizontal axis to accommodate rising and falling movements of said spindle support, the upper end of said spindle support being threaded and rotatably received within the threaded bore in said bearing member to accommodate turning movement of said spindle support relative to said upper suspension arm, an antifriction ball joint assembly connecting the outer end of said lower suspension arm with the lower end of said spindle support, and a spring loaded friction producing pivotal connection between relatively rotatable parts of said steering linkage to dampen vibrations and stabilize the steering system.

2. In a motor vehicle steering assembly including upper and lower wheel carrying suspension arms, a spindle support, steering gear mechanism and interconnected steering lingage, the combination of a semispherical socket at the outer end of the upper suspension arm, a sheet metal bearing shell mounted in said socket and having a semispherical inner surface formed therein, a spherical bearing member seated within said shell and engageable with the semispherical surface thereof, a circular opening in the side of said shell, an elongated vertically extending groove having a generally semicircular cross section formed on the periphery of said spherical bearing member in alignment with the circular opening in said shell, a small ball seated in said circular opening and said elongated peripheral groove to prevent rotation of said spherical bearing member in said shell about a generally vertical axis but permitting oscillation of said spherical bearing member relative to said shell about a generally horizontal axis to accommodate rising and falling movements of said wheel spindle, said spherical bearing member having a threaded bore extending generally vertically therethrough, the upper end of said spindle support having a threaded portion engageable with the threaded bore in said spherical bearing member to accommodate turning movement of said spindle support to steer the vehicle, an antifriction ball joint assembly connecting the outer end of said lower suspension arm with the lower end of said spindle support, and a spring loaded friction producing pivotal connection between relatively rotatable parts of said steering linkage to dampen vibrations and stabilize the steering system.

References Cited in the file of this patent

UNITED STATES PATENTS

| | | |
|---|---|---|
| 1,272,534 | Rogers | July 16, 1918 |
| 2,049,163 | Hufferd | July 28, 1936 |
| 2,179,856 | Leighton | Nov. 14, 1939 |
| 2,521,335 | Booth | Sept. 5, 1950 |
| 2,660,908 | French et al. | Dec. 1, 1953 |
| 2,701,151 | Booth | Feb. 1, 1955 |

FOREIGN PATENTS

| | | |
|---|---|---|
| 278,501 | Great Britain | Oct. 13, 1927 |
| 329,363 | Great Britain | May 29, 1930 |
| 645,627 | Great Britain | Nov. 1, 1950 |